Patented Apr. 3, 1951

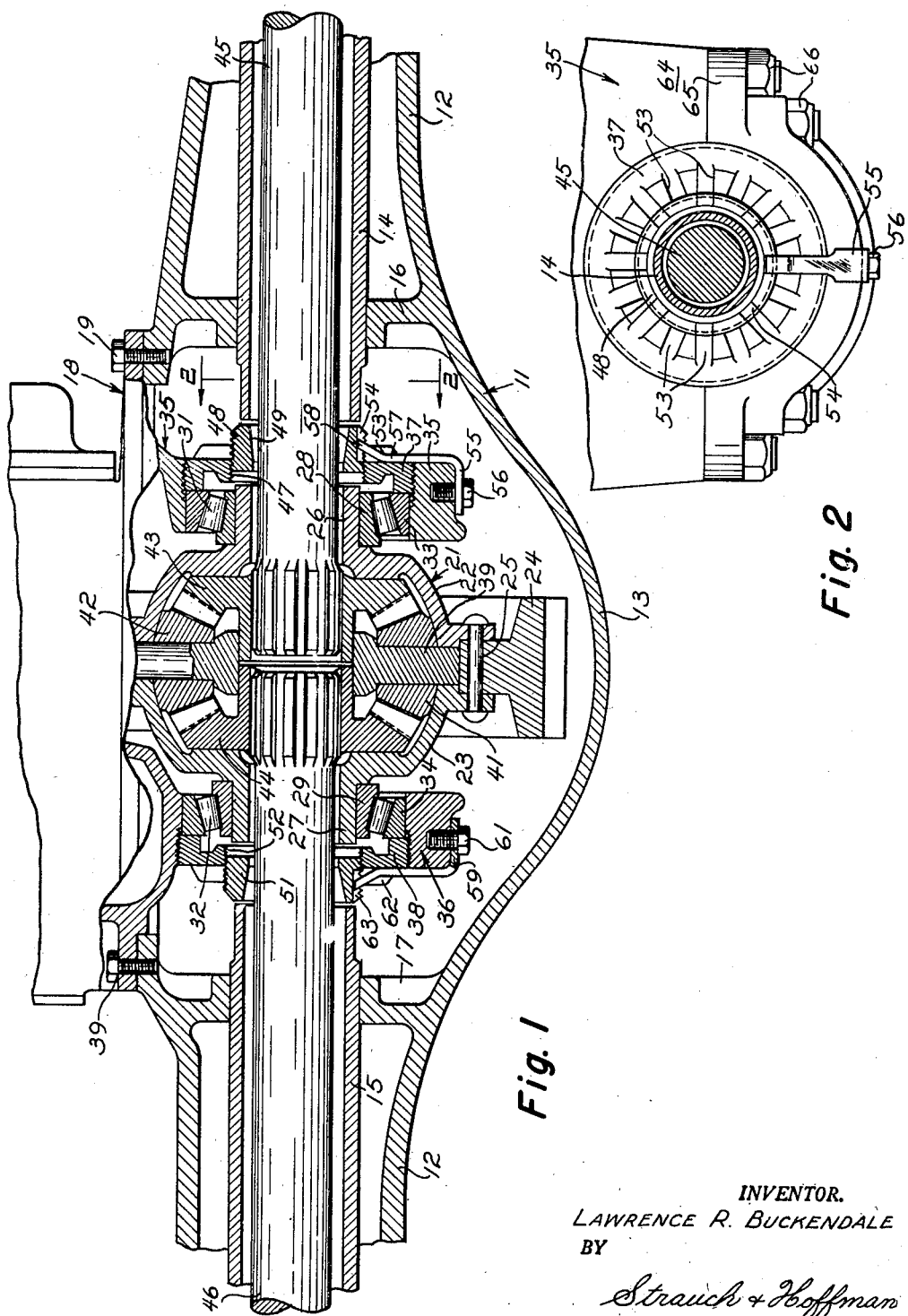
INVENTOR.
LAWRENCE R. BUCKENDALE
BY
Strauch & Hoffman
ATTORNEYS

2,546,969

UNITED STATES PATENT OFFICE 2,546,969

COLLARS TO PREVENT BROKEN AXLE SHAFT FRAGMENTS ENTERING AXLE CENTER SECTION

Lawrence R. Buckendale, Detroit, Mich., assignor to The Timken-Detroit Axle Company, Detroit, Mich., a corporation of Ohio Application July 24, 1947, Serial No. 763,354

8 Claims. (Cl. 74—713)

This invention relates to vehicle drive axles and more particularly to drive axle mechanisms constructed and arranged to prevent damage to the internal drive axle parts in the event that an axle shaft breaks or splinters during operation.

In a vehicle having more than one drive axle assembly, an axle shaft in one of the axle housings may break without the operator being aware of it inasmuch as the other drive axle may continue to supply adequate driving torque. As the vehicle continues to operate in such condition, broken axle shaft fragments or splinters usually work their way into the portion of the axle housing containing the axle shaft driving mechanism thereby causing serious damage to this mechanism and necessitating rebuilding of the entire driving mechanism including the drive gears, differential and bearings. Even in vehicles having only one drive axle, fragments from a fractured axle shaft may become displaced into the differential and drive gear portion of the axle housing and cause such damage even in the short interval before the vehicle is stopped, or the damage may take place after the broken shaft has been replaced if the fragments have not been completely cleaned out of the housing.

It is therefore the primary object of this invention to prevent fragments of a broken axle shaft from entering the portion of an axle housing containing the drive mechanism.

A further object of this invention is to provide in a drive axle housing having an enlarged center section and a pair of hollow arms opening into the center section and embodying live axle shafts extending through the hollow arms into operative connection with a differential disposed in the housing center section, novel extension members, preferably adjustable, disposed between the differential and the housing enclosing the shafts for preventing parts of a broken axle shaft from entering the housing center section.

It is a further object of the invention to provide in a drive axle housing, cooperating instrumentalities on the differential carrier and the interior of the housing for protecting the differential and drive gearing against injury when an axle shaft becomes broken.

A further object of the invention is to provide a novel drive axle construction wherein a driven axle shaft is substantially completely compartmented within the axle housing during operation so as to protect the other drive mechanism in the axle housing against injury in the event that the axle shaft breaks.

A further object of the invention is to provide a novel drive axle construction wherein the axle housing contains an axle shaft surrounding sleeve, and a collar is provided between the inner end of the sleeve and the differential carrier to isolate the shaft from that portion of the axle housing containing the axle shaft drive mechanism. Preferably the collar is adjustable for ease in installation and to close the gap at the sleeve end.

These and other objects of the invention will become apparent as the description of the invention proceeds in connection with the appended claims and the annexed drawings wherein:

Figure 1 is a top plan view partly broken away and in section of a drive axle according to a preferred embodiment of the invention; and Figure 2 is a section on line 2—2 in Figure 1.

A drive axle housing 11 is provided with hollow arms 12 connected by an enlarged center section 13. Wheel bearing sleeves 14 and 15 which journal wheel assemblies (not shown) at their outer ends extend axially through the housing arms and are rigidly supported at their inner ends in radial walls 16 and 17 adjacent housing center section 13.

The outer ends of the wheel bearing sleeves project through the open outer ends of axle housing arms 12 to serve as effective extensions of the axle housing and are suitably supported along their inserted length by housing arms 12. Bearings for the wheels (not shown) are mounted on the outer ends of sleeves 14 and 15 beyond the arms 12. This is conventional drive axle construction as illustrated in Alden patent No. 2,287,009 issued June 23, 1942 to which attention is directed for more detail as to the outer end of the wheel bearing sleeves if such is deemed necessary.

A differential carrier 18 is secured to the open front end of housing center section 13, as by bolts 19, and a conventional differential mechanism 21 is mounted on the carrier within housing center section 13.

Differential 21 comprises opposed differential cage halves 22 and 23 that are secured together and to a drive gear 24 as by rivets or bolts indicated at 25. Gear 24 is in mesh with the usual propellor shaft driven pinion (not shown) mounted in carrier 18. The differential cage 21 is provided with oppositely extending bosses 26 and 27 on the respective halves fixed within the inner races 28 and 29 of coaxial roller bearing assemblies 31 and 32.

The outer races 33 and 34 of the roller bearing assemblies are mounted for axial adjustment within coaxial bores in legs 35 and 36 of the carrier which project into the housing center section. These differential supporting bores are internally threaded at their outer ends to receive annular lock nuts 37 and 38 which serve to axially locate the differential mechanism and to preload bearings 31 and 32.

Differential 21 comprises a spider 39 rigid with the cage halves, pinions 41 and 42 rotatable on the spider arms and side gears 43 and 44 meshed with the pinions. Coaxial axle shafts 45 and 46 are fixedly splined at their inner ends to side gears 43 and 44, and extend freely and oppositely through the axle housing arms to the wheels as illustrated in said Alden patent.

Except for the extension of sleeves 14 and 15 into proximity with carrier legs 35 and 36, the above described axle construction is substantially conventional. The invention in its preferred embodiment will be described in the form of means for closing the gap between the end of each sleeve surrounding the axle shafts and the adjacent carrier leg to prevent fragments of a broken axle shaft from entering housing center section 13.

The internal periphery of lock nut 37 is threaded at 47 to rotatably receive an axially adjustable collar 48 that is suitably externally threaded and has an inner diameter sufficient to clear shaft 45 and its splined inner end. Preferably collar 48 is tapered internally as at 49 to permit and guide insertion of the axle shaft therethrough into the differential mechanism during assembly of the axle. A similar collar 51 is rotatably mounted in the threaded internal periphery 52 of lock nut 38.

Sleeves 14 and 15 are made of sufficient length to terminate in proximity to the carrier legs 35 and 36. As far as the present invention is concerned, the inner ends of sleeves 14 and 15 may be regarded as inward extensions of the hollow axle arms surrounding the axle shafts. Collars 48 and 51 are of such length as to extend between their supporting lock nuts and the adjacent sleeve ends without losing threaded engagement with the former. Preferably the axial distance between the outer end of each lock nut 37 and 38 and the adjacent sleeve end is smaller than the axial length of the associated collar so that collars 48 and 51 are always supported by the carrier legs regardless of their adjusted position.

Collars 48 and 51 may be independently adjusted in an axially outward direction to substantially abut the adjacent end faces of sleeves 14 and 15 when the carrier is bolted to the axle housing, the degree of adjustment depending upon variations in the length of the sleeves and the variable axial positions of the differential bearing adjustments of lock nuts 37 and 38. This adjustment is usually made before the carrier is bolted to the axle housing, but where the axle housing has a removable bowl it may be made after assembly.

As illustrated best in Figure 2, lock nut 37 is formed in its outer side with a plurality of radial surface grooves 53, and collar 48 is formed in its outer periphery with a plurality of radial surface notches 54. A retainer plate 55 is secured to the lower end of carrier leg 35, as by a bolt 56, and is formed with a radially projecting tongue 57 adapted to lie within one of the lock nut grooves 53 and with an outwardly bent terminal 58 adapted to lie in one of notches 54 of collar 48. Plate 55 thus retains the bearing adjustment of lock nut 37 and the adjusted axial position of collar 48 by preventing their rotation.

A similar retainer plate 59, secured to the bottom of carrier leg 36 as by bolt 61, extends into one of similar radial grooves 62 in lock nut 38 and one of similar notches 63 in collar 51 to retain them in adjusted position. If desired plates 55 and 59 may be arcuate or even circular with a plurality of radial retainer tongues in the grooves and notches.

In the illustrated example of Figure 2, the carrier leg 35 is of the type wherein the base portion 64 of the leg rigid with the carrier is formed with one half of the differential supporting bore, while the coacting half of the bore is in a cap 65 that is bolted as at 66 to base 64. It will be understood that the invention is applicable equally well to any other carrier leg structure as where the carrier legs may be integral projections of the carrier.

Furthermore, while the adjustable collars 48 and 51 are preferably mounted on the carrier, they may be mounted on the inner ends of the sleeves 14 and 15 without departing from the spirit of the invention. Also, while collars 48 and 51 are illustrated as coacting with inserted sleeves in the axle housings, it will be understood that they may similarly coact with any suitable internal axle housing formations for the same purpose of isolating the axle shafts from the center section, as for example where, in an axle having no sleeves 14 and 15 as illustrated, radial walls 16 and 17 of the housing might be provided with inwardly extending hollow bosses serving the same purpose as the inner ends of the sleeves.

In my invention the axle shafts are substantially isolated from the differential mechanism and the drive gearing so that should one of the shafts 45 or 46 become broken in operation, the splinters or fragments will be retained within the enclosure or compartment provided by the sleeves and adjustable collars and the ends of the differential mechanism, and cannot work their way into a position to damage the parts of the driving assembly in the housing center section.

The invention may be embodied in other specific forms without departing from the spirit or essential characteristics thereof. The present embodiments is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drive axle assembly, an axle housing having an intermediate drive mechanism enclosing portion, drive mechanism in said portion and a support on said housing for said drive mechanism, an axle shaft extending therefrom through said housing, means within said housing surrounding said axle shaft and extending into proximity with said driving mechanism, and an axially adjustable collar on said support extending between said support for the driving mechanism and said axle shaft enclosing means within the housing for substantially closing the gap between said support and said axle shaft enclosing means so that said axle shaft is substantially isolated from the drive mechanism in said intermediate portion of said axle housing.

2. In the drive axle assembly defined in claim 1, said collar having a tapered bore with its larger end outwardly of said support for guiding insertion of the axle shaft during assembly.

3. In a drive axle assembly, a housing having an enlarged intermediate portion and longitudinally extending hollow arms opening into said intermediate portion, a differential carrier mounted on said housing and projecting into said intermediate portion, differential mechanism journaled on said carrier within said intermediate portion, axle shafts extending through said arms into said differential mechanism, a wheel bearing sleeve supported in each said housing arm, said axle shafts extending through said sleeves and said sleeves having their inner ends terminating within said intermediate portion of the housing, and means variable in length surrounding said axle shafts and extending between said carrier and the inner ends of said sleeves for substantially closing the gaps between said carrier and said sleeves and isolating said axle shafts from said intermediate portion of said axle housing.

4. In the drive axle assembly defined in claim 3, said variable length means comprising axially adjustable collars mounted on said carrier and extending toward said inner ends of the sleeves.

5. In a drive axle assembly, a housing having an intermediate portion, a drive gear carrier secured to said housing and projecting into said intermediate portion, an axle shaft extending through said housing and drive gearing supported by said carrier within said intermediate portion connected to the inner end of said axle shaft, means within said housing substtntially enclosing and surrounding said axle shaft and extending into proximity with one side of said carrier through which said axle shaft emerges, and axially adjustable means on said carrier for substantially closing the gap between said carrier and the adjacent ends of said axle shaft surrounding means whereby said axle shaft is substantially isolated from said intermediate portion of the housing.

6. In a drive axle assembly, a housing having an enlarged intermediate portion and oppositely extending hollow arms, wheel bearing sleeves in said arms projecting into said intermediate portion, a differential carrier removably secured to said housing and projecting into said intermediate portion, a differential mechanism journaled on said carrier within said intermediate portion, axle shafts extending from said differential mechanism outwardly through sleeves, bearing supports for said differential mechanism on opposite sides of said carrier, bearing adjustment rings on each side of said carrier, and collars mounted on said rings for axial adjustment for closing the gaps between opposite sides of said carrier and adjacent ends of said sleeve whereby the axle shaft is substantially isolated from said intermediate portion of the housing.

7. In a drive axle assembly containing a rotatable drive shaft, a housing, a differential carrier removably mounted on said housing, spaced differential cage supporting bearings on said carrier within said housing, annular bearing adjustment means mounted on opposite sides of said carrier, means rigid with said housing surrounding said shafts adjacent said carrier and terminating adjacent said carrier sides, and axially adjustable annular collars mounted on said annular means and projecting away from said carrier to close the gap between said carrier and said shaft surrounding means.

8. In the drive axle assembly defined in claim 7, common means for locking said bearing adjustment means and collars in adjusted position.

LAWRENCE R. BUCKENDALE.

REFERENCES CITED

The following references are of record in the file of this patent:

UNITED STATES PATENTS

| Number | Name | Date |
| --- | --- | --- |
| 753,022 | White | Feb. 23, 1904 |
| 997,997 | Hardegen | July 18, 1911 |
| 1,076,560 | Duffy | Oct. 21, 1913 |
| 1,110,033 | Baker | Sept. 8, 1914 |
| 1,509,250 | Miller | Sept. 23, 1924 |
| 1,556,875 | Ormsby | Oct. 13, 1925 |
| 1,614,992 | Roberts | Jan. 18, 1927 |
| 1,636,819 | Huck | July 26, 1927 |
| 2,043,006 | Morgan | June 2, 1936 |

FOREIGN PATENTS

| Number | Country | Date |
| --- | --- | --- |
| 14,687 | Great Britain | Oct. 18, 1915 |